(12) United States Patent
Otani

(10) Patent No.: US 10,502,938 B2
(45) Date of Patent: *Dec. 10, 2019

(54) LIGHT OUTPUTTING APPARATUS AND IMAGE DISPLAY SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,106

(22) Filed: Mar. 16, 2018

(65) Prior Publication Data

US 2018/0284409 A1 Oct. 4, 2018

(30) Foreign Application Priority Data

Mar. 28, 2017 (JP) ................. 2017-062391

(51) Int. Cl.
*G09G 5/00* (2006.01)
*G02B 19/00* (2006.01)
*G06F 3/042* (2006.01)
*G02B 27/09* (2006.01)

(52) U.S. Cl.
CPC ....... *G02B 19/0014* (2013.01); *G02B 19/009* (2013.01); *G02B 19/0047* (2013.01); *G02B 27/0927* (2013.01); *G02B 27/0961* (2013.01); *G06F 3/0425* (2013.01)

(58) Field of Classification Search
CPC .............. G02B 19/0014; G02B 19/009; G02B 19/0047; G02B 27/0927; G02B 27/0961; G06F 3/0425
See application file for complete search history.

(56) References Cited

U.S. PATENT DOCUMENTS

| | | | | |
|---|---|---|---|---|
| 2005/0219496 | A1* | 10/2005 | Oshida | G02B 26/123 355/67 |
| 2013/0301058 | A1 | 11/2013 | Nunnink | |
| 2015/0103320 | A1* | 4/2015 | Iijima | G03B 21/006 353/31 |
| 2015/0116216 | A1* | 4/2015 | Sakai | G06F 3/0425 345/157 |
| 2015/0124223 | A1* | 5/2015 | Yamauchi | G03B 21/2093 353/20 |
| 2016/0062223 | A1* | 3/2016 | Akiyama | H04N 9/3164 353/31 |

FOREIGN PATENT DOCUMENTS

JP 2015-111385 A 6/2015

* cited by examiner

*Primary Examiner* — Kent W Chang
*Assistant Examiner* — Andrew Lee
(74) *Attorney, Agent, or Firm* — Oliff PLC

(57) ABSTRACT

A light outputting apparatus includes a light outputting section that outputs light, and the light outputting section includes a light source that emits light, a collimator lens for parallelizing the light emitted from the light source, and an optical element including a plurality of lenslets that widen the light having passed through the collimator lens in a direction perpendicular to the optical axis of the light source and corresponding to a first direction that is one of first and second directions perpendicular to each other.

14 Claims, 9 Drawing Sheets

LIGHT OUTPUTTING APPARATUS AND IMAGE DISPLAY SYSTEM

BACKGROUND

1. Technical Field

The present invention relates to a light outputting apparatus and an image display system.

2. Related Art

There has been a known image display system that detects the position of a pointing element (pen or user's finger, for example) operated on a display surface on which an image is displayed and, based on the result of the detection, performs display operation according to the trajectory of the pointing element and changes the display operation. For example, there is a disclosed image display system which includes a projector and a light outputting apparatus that outputs light along a projection surface on which the projector performs projection and in which the projector detects the position of a pointing element operated on the projection surface based on the light reflected off the pointing element and performs the projection based on the result of the detection (JP-A-2015-111385, for example).

The light outputting apparatus described in JP-A-2015-111385 includes a light source, a collimation lens that parallelizes light emitted from the light source, and a directional lens (Powell lens) that widens the light parallelized by the collimation lens and extending in the direction along a projection surface (first direction).

The Powell lens has a convex shape on the light incident side and a flat shape on the light exiting side when viewed in a second direction perpendicular to the first direction and has a rectangular shape when viewed in the first direction.

In the light outputting apparatus described in JP-A-2015-111385, however, when the positional relationship between the light source and the Powell lens deteriorates, the optical intensity on the projection surface is greatly offset, and it is difficult for the projector to detect the position of the pointing element with accuracy. The light outputting apparatus described in JP-A-2015-111385 therefore has a problem of an increase in man-hour for aligning the light source and the Powell lens.

SUMMARY

An advantage of some aspects of the invention is to solve at least a part of the problems described above, and the invention can be implemented as the following forms or application examples.

Application Example 1

A light outputting apparatus according to this application example is a light outputting apparatus including a light outputting section that outputs light, and the light outputting section includes a light source that emits light, a collimator lens for parallelizing the light emitted from the light source, and an optical element including a plurality of lenslets that widen the light having passed through the collimator lens in a direction perpendicular to an optical axis of the light source and corresponding to a first direction that is one of first and second directions perpendicular to each other.

According to the configuration described above, the light outputting apparatus, in which the light emitted from the light source and roughly parallelized by the collimator lens is widened by the optical element in the direction corresponding to the first direction, outputs the resultant light. As a result, installing the light outputting apparatus on one side of a target predetermined flat surface (target flats surface) in such a way that the first direction extends along the target flat surface allows effective use of the light emitted from the light source, whereby the light outputting apparatus provided in this application example can output light along the target flat surface.

Further, in the light outputting apparatus, the optical element includes a plurality of lenslets, and the plurality of lenslets each widen light incident thereon. The light having exited out of the optical element is formed of light fluxes widened by the plurality of lenslets and superimposed on each other. The light outputting apparatus can thus suppress offset of the optical intensity distribution in an area along the target flat surface even in a case where the precision in the alignment between the light source and the optical element is relaxed, as compared with a configuration in which the widening member is formed of a single lens. The light outputting apparatus provided by this application example therefore allows assembly man-hour (position adjustment man-hour) to be reduced and light having suppressed variation in the optical intensity distribution to be outputted over the area along the target flat surface.

Further, the degree of dependence on the intensity distribution of the light emitted from the light source can be reduced, whereby the light source can be selected with increased flexibility.

Application Example 2

In the light outputting apparatus according to the application example described above, it is preferable that the light source has a light emitting portion larger in the first direction than in the second direction, and that the optical element widens the light incident thereon only in the direction corresponding to the first direction.

According to the configuration described above, since the light from the light emitting portion smaller in the second direction than in the first direction is incident on the collimator lens, the light having exited out of the collimator lens is light more parallelized in the second direction than in the first direction. The optical element then widens the light incident thereon only in the direction corresponding to the first direction. The light outputting apparatus can therefore suppress diffraction and efficiently output light along the target flat surface over a wider range.

Application Example 3

In the light outputting apparatus according to the application example described above, it is preferable that the light outputting section is formed of a first light outputting section and a second light outputting section that are so disposed with respect to an imaginary central plane along the second direction that light outputted from each of the light outputting sections travels gradually away from the imaginary central plane, that the first light outputting section outputs light having a center axis extending in a first inclination direction inclining toward one side with respect to the imaginary central plane, that the second light outputting section outputs light having a center axis extending in a second inclination direction inclining toward another side with respect to the imaginary central plane, and the first light outputting section and the second light outputting section are so disposed that part of the light outputted by the first light outputting section and part of the light outputted by the second light outputting section overlap with each other on both sides of the imaginary central plane.

According to the configuration described above, the light outputting apparatus, which includes the first light outputting section and the second light outputting section disposed as described above, can output light from the one side of the target flat surface along a wider target flat surface.

Further, installing the light outputting apparatus in the vicinity of the center of one of the four edges of the target flat surface having a rectangular shape and setting the first inclining direction to be the direction extending from the first light outputting section toward one corner of the edge facing the one edge and the second inclining direction to be the direction extending from the second light outputting section toward the other corner of the edge facing the one edge allow the light toward the vicinities of the corners of the target flat surface that are farthest from the light outputting apparatus to have increased intensity. The light outputting apparatus provided by this application example can therefore efficiently output light along the rectangular, wide target flat surface.

Application Example 4

In the light outputting apparatus according to the application example described above, it is preferable that the plurality of lenslets each have a center axis extending along the second direction, that the plurality of lenslets in the first light outputting section are each formed asymmetrically with respect to a first lens central plane that contains the center axis and extends along the first inclination direction, that the plurality of lenslets in the second light outputting section are each formed asymmetrically with respect to a second lens central plane that contains the center axis and extends along the second inclination direction, that the first light outputting section outputs light in such a way that intensity of light traveling in a direction inclining toward the imaginary central plane with respect to the first inclination direction is lower than intensity of light traveling in a direction inclining toward a side opposite the imaginary central plane with respect to the first inclination direction, and that the second light outputting section outputs light in such a way that intensity of light traveling in a direction inclining toward the imaginary central plane with respect to the second inclination direction is lower than intensity of light traveling in a direction inclining toward a side opposite the imaginary central plane with respect to the second inclination direction.

According to the configuration described above, the plurality of lenslets provided in the optical element of each of the first light outputting section and the second light outputting section are each asymmetrically formed as described above, and the light outputted by each of the first light outputting section and the second light outputting section is so configured that the intensity of the light toward the imaginary central plane is lower than the intensity of the light toward the side opposite the imaginary central plane. Since the first light outputting section and the second light outputting section are so disposed that part of the light outputted by the first light outputting section and part of the light outputted by the second light outputting section overlap with each other on both sides of the imaginary central plane, the intensity of the overlapping light is allowed to be comparable to the intensity of the light toward the side opposite the imaginary central plane out of the light outputted by the first light outputting section and the light outputted by the second light outputting section. The light outputting apparatus provided by this application example can therefore output light having sufficient optical intensity across the entire area along the target flat surface from the one side of the rectangular target flat surface with no increase in the intensity of the light from the light source. The light outputting apparatus provided by this application example can therefore efficiently output light having an appropriate optical intensity distribution over the areas along the target flat surface that are separate from the light outputting apparatus by different distances.

Application Example 5

In the light outputting apparatus according to the application example described above, it is preferable that the optical element in the first light outputting section and the optical element in the second light outputting section are integrated with each other.

According to the configuration described above, the relative positional precision between the optical element in the first light outputting section and the optical element in the second light outputting section can be increased, whereby discrepancy between the intensity distribution of the light outputted by the first light outputting section and the intensity distribution of the light outputted by the second light outputting section can be suppressed. The light outputting apparatus provided by this application example can therefore output light having further suppressed variation in the optical intensity in the area along the target flat surface.

Further, since the optical elements are integrated with each other, the size of the light outputting apparatus can be reduced.

Application Example 6

In the light outputting apparatus according to the application example described above, it is preferable that the light incident on the optical element is P-polarized light.

According to the configuration described above, since P-polarized light, the reflectance of which is lower than that of S-polarized light, is incident on the optical element, the light emitted from the light source can be effectively used.

Application Example 7

In the light outputting apparatus according to the application example described above, it is preferable that the collimator lens is so configured that curvature of a lens surface in the first direction differs from curvature of a lens surface in the second direction.

According to the configuration described above, for example, a collimator lens having curvature that allows the incident light in the second direction to be parallelized and differs between the first direction and the second direction allow suppression of diffraction at the optical element.

Application Example 8

An image display system according to this application example includes the light outputting apparatus described in any one of the application examples, a detection apparatus that detects a position where light outputted from the light outputting apparatus is reflected, and a projection apparatus that projects an image according to a result of the detection performed by the detection apparatus.

According to the configuration described above, the image display system, which includes the light outputting apparatus described above, can output light along the entire projection surface (target flat surface), such as a screen and a whiteboard, by effectively using the light emitted from the light source. Therefore, in the image display system, the detection apparatus can stably detect the position of a pointing element or any other object that reflects the light outputted along the projection surface, and the projection apparatus can project an image according to the result of the detection, for example, an image containing the trajectory of the pointing element on the projection surface, on the projection surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A light outputting apparatus and an image display system according to the present embodiment will be described below with reference to the drawings.

Figure 1:
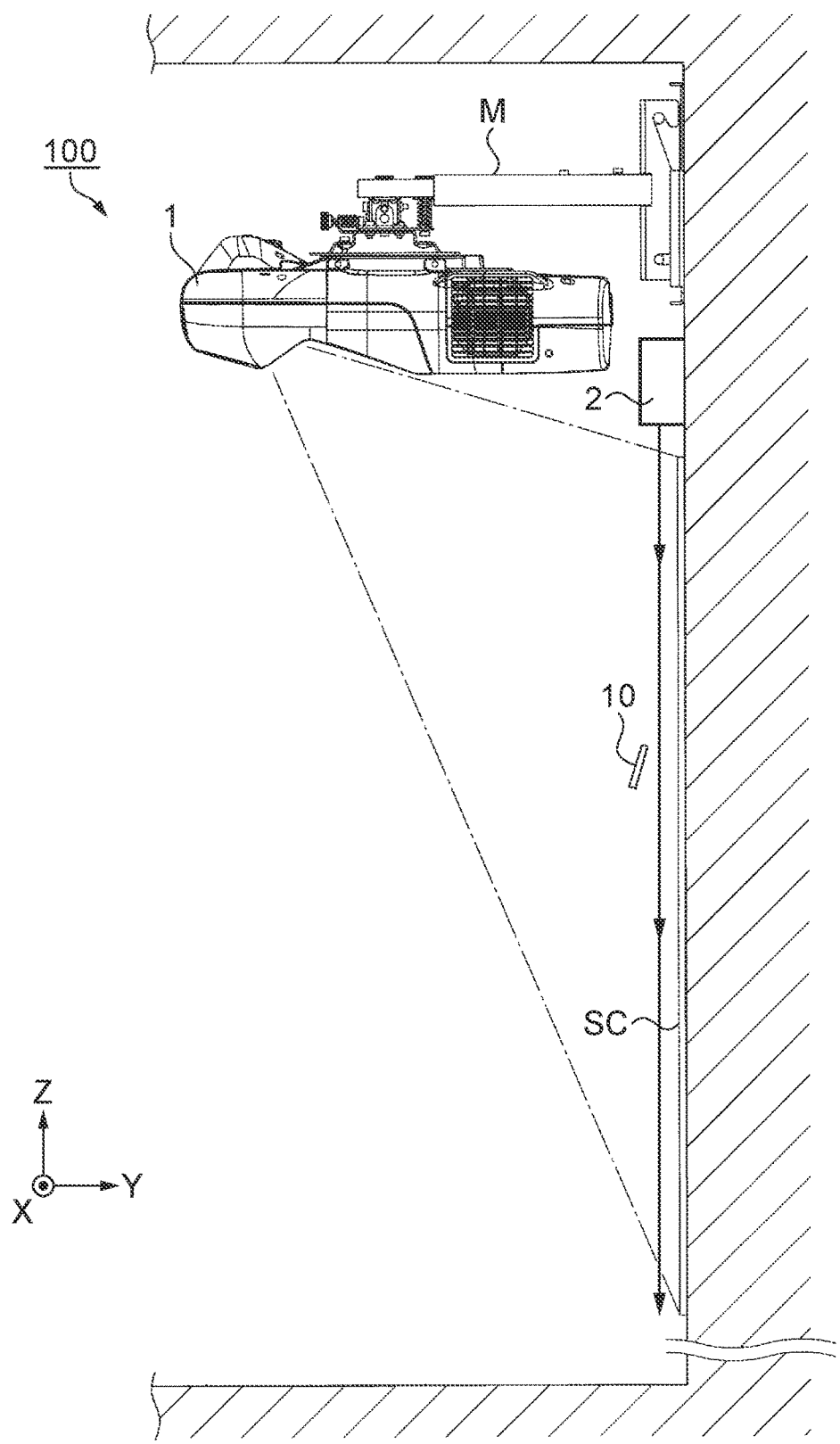
FIG. 1 is a diagrammatic view showing a schematic configuration of an image display system according to a first embodiment.

FIG. 1 is a diagrammatic view showing a schematic configuration of an image display system 100 according to the present embodiment.

The image display system 100 includes a projector 1 and a light outputting apparatus 2, as shown in FIG. 1.

Figure 2:
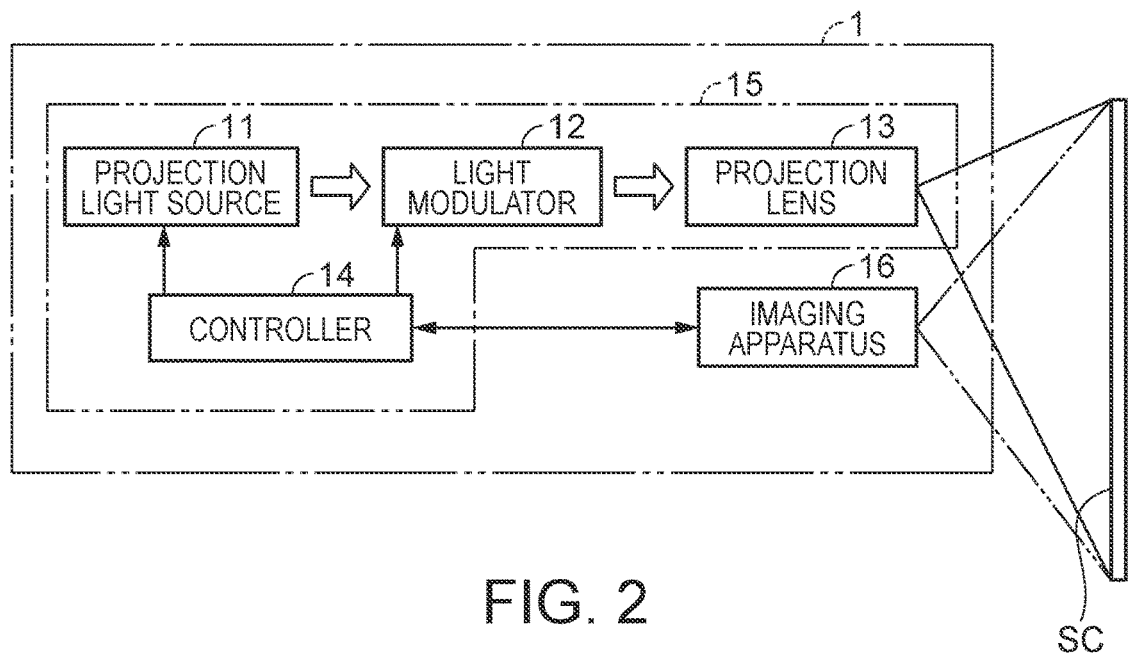
FIG. 2 is a block diagram showing a schematic configuration of a projector in the first embodiment.

FIG. 2 is a block diagram showing a schematic configuration of the projector 1.

The projector 1 includes a projection apparatus 15 and an imaging apparatus 16 as a detection apparatus, as shown in FIG. 2.

The projection apparatus 15 includes a projection light source 11, a light modulator 12, a projection lens 13, and a controller 14 and projects an image according to inputted image information and an image according to a result of the detection performed by the imaging apparatus 16.

The projector 1 is supported by a support apparatus M, which is installed on a wall surface above a projection surface SC, such as a screen and a whiteboard, and projects an image through the surface facing downward on the projection surface SC, as shown in FIG. 1. In the sections below, the directions are defined as follows for ease of description: The direction of a normal to the projection surface SC is a forward/rearward direction and the direction toward the projection surface SC is the forward direction (+Y direction); the direction against the gravity is an upward direction (+Z direction); and the right side corresponds to a right direction (+X direction) when viewed in the direction toward the projection surface SC.

In the projection apparatus 15, the light modulator 12 modulates light emitted from the projection light source 11 in accordance with image information, and the projection lens 13 projects the modulated light on the projection surface SC. The light modulator 12 can, for example, be a device using a liquid crystal panel or a micromirror-type device, for example, a device using a DMD (digital micromirror device).

The controller 14 includes a CPU (central processing unit), a ROM (read only memory), a RAM (random access memory), and other components, so that the controller 14 functions as a computer, and the controller 14 controls the action of the projector 1, for example, performs control relating to image projection based on information outputted from the imaging apparatus 16, which will be described later.

The light outputting apparatus 2, although the configuration thereof will be described later in detail, is installed on the wall surface above the projection surface SC, which is a target flat surface, and outputs light along the projection surface SC, as shown in FIG. 1.

The imaging apparatus 16 includes an imaging device (not shown), for example, a CCD (charge coupled device) and a CMOS (complementary metal oxide semiconductor) device, captures an image of the projection surface SC as a subject, and outputs information on the captured image to the controller 14. When the light outputted from the light outputting apparatus 2 is reflected off a pointing element (pen 10 or user's finger, for example), the imaging apparatus 16 detects the position of the pointing element (reflection position) and outputs information on the detected position to the controller 14.

The projector 1 analyzes the position of the pointing element on the projection surface SC based on the information outputted from the imaging apparatus 16. Based on the result of the analysis, the projector 1, for example, projects a superimposed image formed of the image information on which a line representing the trajectory of the pointing element is superimposed, changes the projected image, and performs other types of operation.

Configuration of Light Outputting Apparatus

Figure 3:
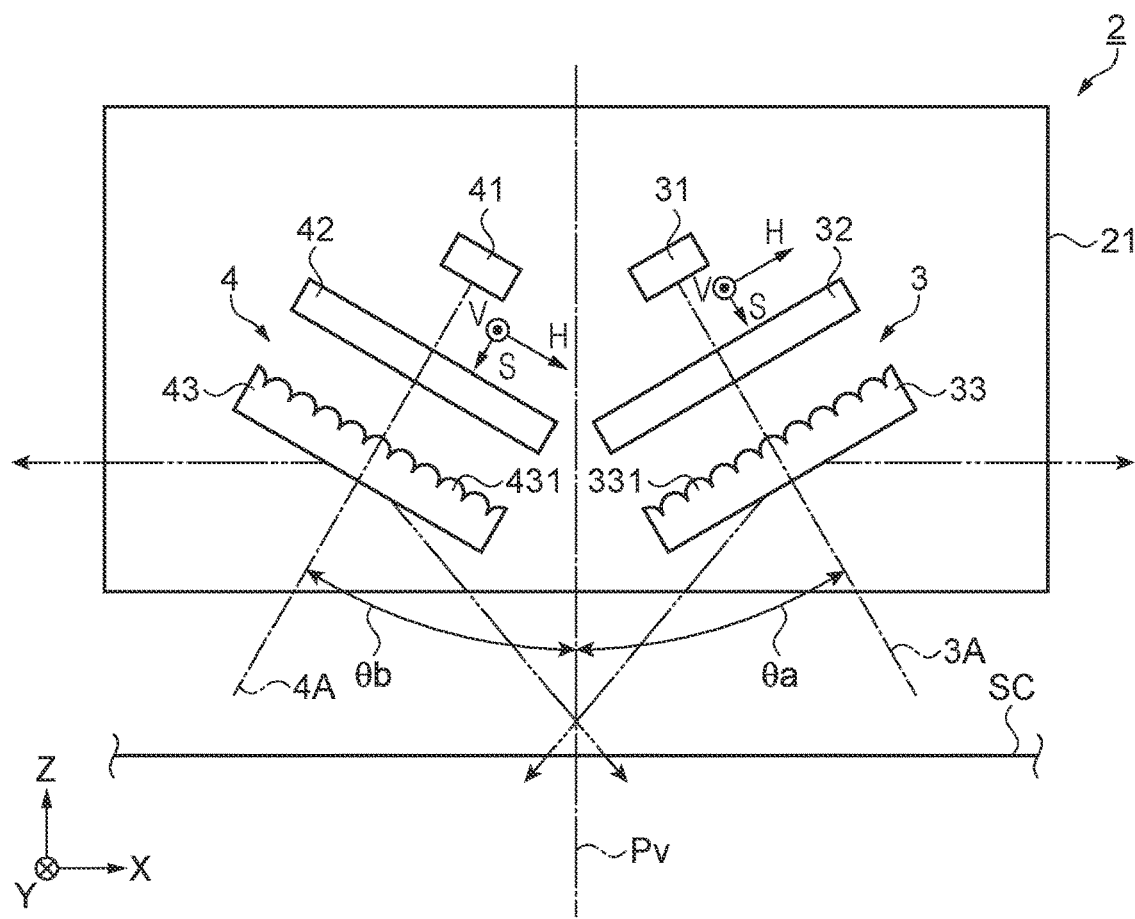
FIG. 3 is a diagrammatic view showing a schematic configuration of a light outputting apparatus in the first embodiment.

FIG. 3 is a diagrammatic view showing a schematic configuration of the light outputting apparatus 2.

The light outputting apparatus 2 is disposed in a position separate upward from the projection surface SC and roughly at the center of the rightward/leftward direction of the projection surface SC, as shown in FIG. 3. The light outputting apparatus 2 includes a first light outputting section 3, a second light outputting section 4, and an enclosure 21, which accommodates these members.

The first light outputting section 3 and the second light outputting section 4 are juxtaposed in the rightward/leftward direction. The first light outputting section 3 and the second light outputting section 4 are so disposed that the traveling directions of light fluxes outputted therefrom incline with respect to an imaginary central plane Pv, which is located between the first light outputting section 3 and the second light outputting section 4, is perpendicular to the projection surface SC, and extends in the upward/downward direction, in such away that the light fluxes travel gradually away from the imaginary central plane Pv.

The first light outputting section 3 includes a light source 31, a collimator lens 32, and an optical element 33 including a plurality of lenslets 331. The collimator lens 32 and the optical element 33 are disposed along an optical axis 3A of the light source 31.

The second light outputting section 4 has the same configuration as that of the first light outputting section 3 and includes a light source 41, a collimator lens 42, and an optical element 43 including a plurality of lenslets 431. The collimator lens 42 and the optical element 43 are disposed along an optical axis 4A of the light source 41.

The first light outputting section 3 is located on the right of the imaginary central plane Pv and is so disposed that the optical axis 3A and the imaginary central plane Pv form an inclination angle θa, by which the optical axis 3A inclines with respect to the imaginary central plane Pv counterclockwise (obliquely rightward and downward), as shown in FIG. 3. The second light outputting section 4 is located on the left of the imaginary central plane Pv and is so disposed that the optical axis 4A and the imaginary central plane Pv form an inclination angle θb, by which the optical axis 4A inclines with respect to the imaginary central plane Pv clockwise (optical axis 4A extends obliquely leftward and downward). Further, the first light outputting section 3 and the second light outputting section 4 in the present embodiment are so disposed as to be roughly symmetric with respect to the imaginary central plane Pv. The first light outputting section 3 and the second light outputting section 4 output light fluxes in such a way that part of the light outputted by the first light outputting section 3 and part of the light outputted by the second light outputting section 4 overlap with each other on both sides of the imaginary central plane Pv so that the light fluxes as a whole cover an area across the entire projection surface SC.

Figure 4:
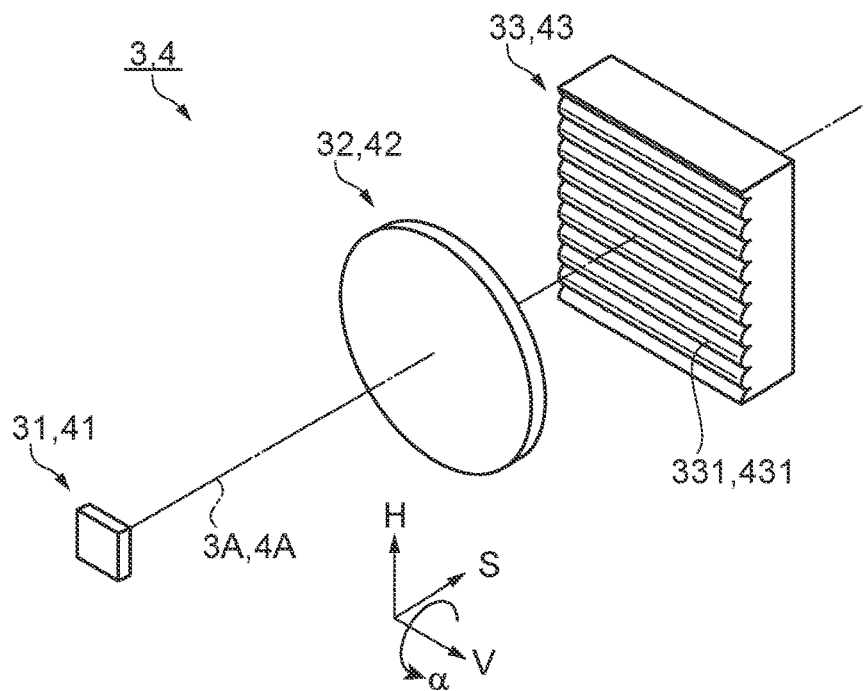
FIG. 4 is a perspective view diagrammatically showing a first light outputting section and a second light outputting section in the first embodiment.
Figure 5:
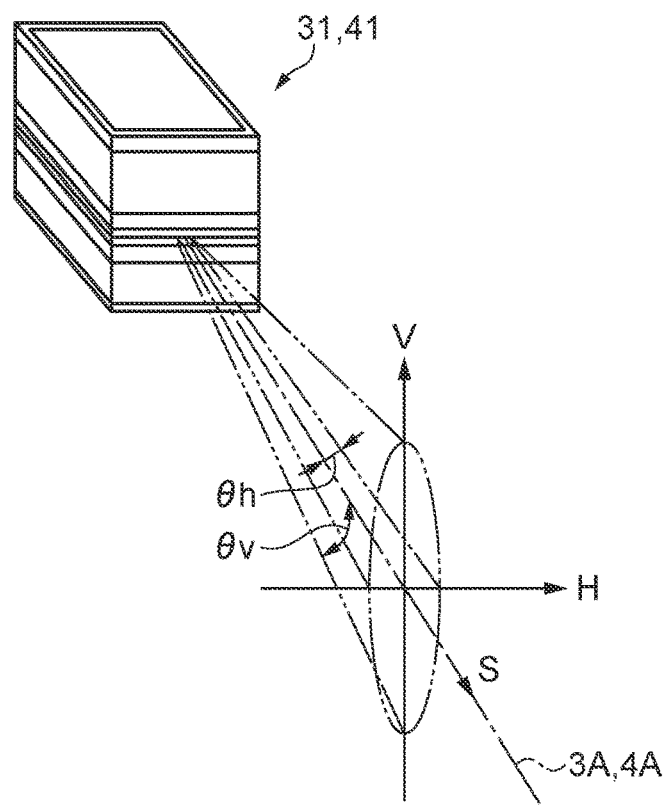
FIG. 5 is a diagrammatic view showing a light source in the first embodiment.

FIG. 4 is a perspective view diagrammatically showing the first light outputting section 3 and the second light outputting section 4. FIG. 5 is a diagrammatic view showing the light sources 31 and 41.

The light sources 31 and 41 are each, for example, a laser light source that emits light having optical intensity that peaks at about 940 nm and each include an active layer, which is a light emitting portion, cladding layers layered on opposite sides of the active layer, and other layers, as shown in FIG. 5. The light emitting portion is smaller in the direction in which the cladding layers are layered on the active layer (second direction V) than in the direction perpendicular to the second direction V (first direction H). The light emitted from each of the light sources 31 and 41 has optical intensity distributions different in the first direction H and the second direction V, and the light sources 31 and 41 each emit light having a center axis that coincides with an emission direction S perpendicular to the first direction H and the second direction V. The emission direction S, along which the light sources 31 and 41 emit light fluxes, is the direction extending along the optical axes 3A and 4A. That is, the light source 31 emits light having optical intensity distributions different from each other between the first direction H and the second direction V, which are perpendicular to the optical axis 3A and to each other. Similarly, the light source 41 emits light having optical intensity distributions different from each other between the first direction H and the second direction V, which are perpendicular to the optical axis 4A and to each other. The light sources 31 and 41 each emit light having intensity higher in the first direction H than in the second direction V over a wide range. The light sources 31 and 41 are each formed, for example, of a multi-mode-oscillation-type laser light source.

Further, the light sources 31 and 41 each emit polarized light in parallel to the first direction H, and P-polarized light is incident on the optical elements 33 and 43. The configuration in which P-polarized light is incident on the optical elements 33 and 43 suppresses optical loss at the optical elements 33 and 43. This will be described later in detail.

The collimator lenses 32 and 42 each have the function of parallelizing the light incident thereon. Since the light source 31 has a light emitting portion larger in the first direction H than in the second direction V, the light in the second direction V having been emitted from the light source 31 and having passed through the collimator lens 32 travels roughly in parallel to the optical axis 3A, and the light in the first direction H travels with slight inclination with respect to the optical axis 3A. Similarly, the light in the second direction V having been emitted from the light source 41 and having passed through the collimator lens 42 travels roughly in parallel to the optical axis 4A, and the light in the first direction H travels with slight inclination with respect to the optical axis 4A.

The optical elements 33 and 43 are each made, for example, of a synthetic resin having a high refractive index and formed in a rectangular shape in a plan view.

The optical element 33 is provided with the plurality of lenslets 331 on the light incident side and has a flat surface on the light exiting side, as shown in FIG. 4. The plurality of lenslets 331 each extend along one edge of the rectangular shape and are arranged along the direction perpendicular to the one side. The optical element 33 is so disposed that the direction in which the plurality of lenslets 331 are arranged coincides with the first direction H. That is, in the first light outputting section 3, the optical element 33 is so configured that the plurality of lenslets 331 are arranged along the first direction H and each extend in the second direction V.

The optical element 33 widens in the first direction H the light having passed through the collimator lens 32, maintains in the second direction V the direction of the light parallelized by the collimator lens 32, and outputs the resultant light having a center axis that coincides with the optical axis 3A. That is, the optical element 33 widens the light incident thereon in the direction corresponding to the first direction H, which is perpendicular to the optical axis 3A. Further, the optical element 33 widens the light incident thereon only in the direction corresponding to the first direction H, which is perpendicular to the optical axis 3A. The light having exited out of the optical element 33 is formed of the light fluxes widened by the plurality of lenslets 331 and superimposed on one another.

The optical element 43, which includes the plurality of lenslets 431, widens in the first direction H the light having passed through the collimator lens 42, maintains in the second direction V the direction of the light parallelized by the collimator lens 42, and outputs the resultant light having a center axis that coincides with the optical axis 4A, as the optical element 33 does. That is, the optical element 43 widens the light incident thereon in the direction corresponding to the first direction H, which is perpendicular to the optical axis 4A. Further, the optical element 43 widens the light incident thereon only in the direction corresponding to the first direction H, which is perpendicular to the optical axis 4A. The light having exited out of the optical element 43 is formed of the light fluxes widened by the plurality of lenslets 431 and superimposed on one another.

The lenslets 331 and 431 are each asymmetrically formed, which will be described later in detail.

The light outputting apparatus 2 is so disposed that the first direction H in each of the first light outputting section 3 and the second light outputting section 4 extends along the projection surface SC. The imaginary central plane Pv is a plane extending along the second direction V.

Figure 6:
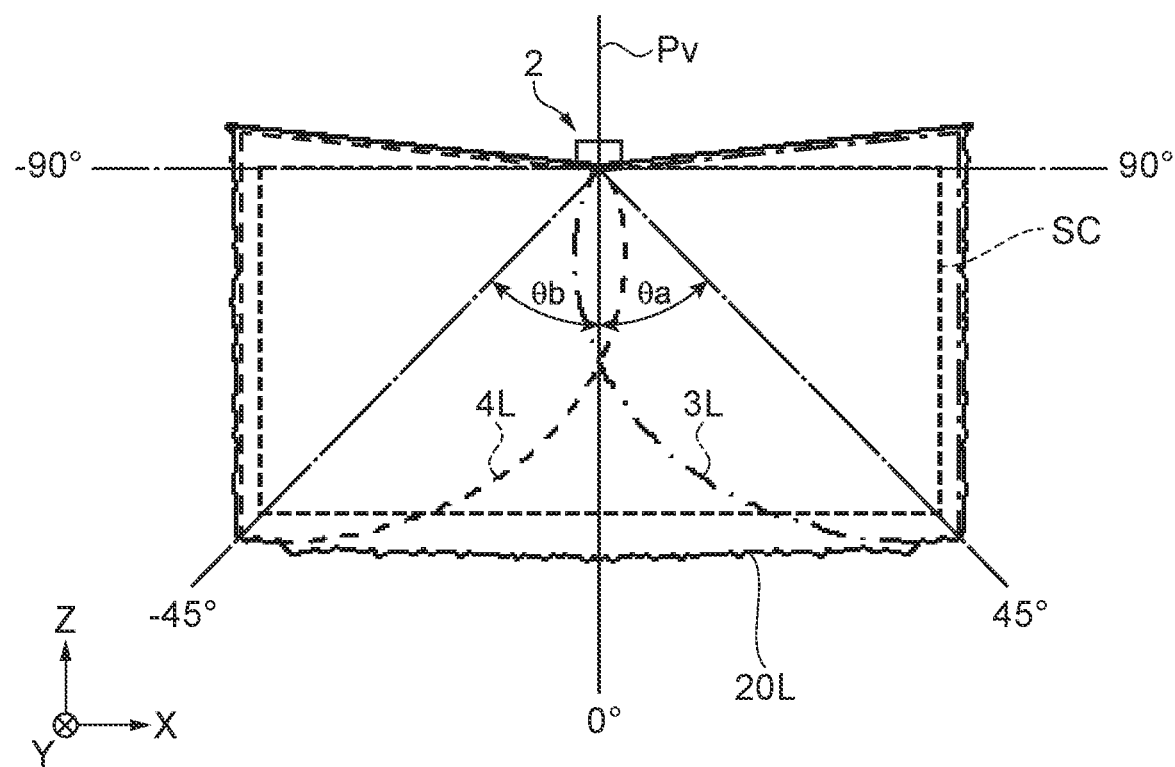
FIG. 6 is a diagrammatic view showing the intensity distribution of light outputted from the light outputting apparatus in the first embodiment.

FIG. 6 is a diagrammatic view showing the intensity distribution of the light outputted from the light outputting apparatus 2 and shows the intensity distribution in an area along the projection surface SC. Since the distance from the light outputting portion of each of the first light outputting section 3 and the second light outputting section 4 to the imaginary central plane Pv is significantly smaller than the size of the projection surface SC, it can be approximately assumed in the description of the intensity distribution that the light outputting portion of each of the first light outputting section 3 and the second light outputting section 4 is located in the imaginary central plane Pv, as shown in FIG. 6. Further, optical intensity distributions 3L, 4L, and 20L shown in FIG. 6 are defined as follows: Reference character 3L represents the intensity distribution of the light outputted from the first light outputting section 3 (first output light); reference character 4L represents the intensity distribution of the light outputted from the second light outputting section 4 (second output light); and reference character 20L represents the intensity distribution of combined light that is the combination of the first output light and the second output light. The optical intensity distributions 3L and 4L shown in FIG. 6 show pointing element detectable optical intensity ranges of the first output light and the second output light, and the optical intensity distribution 20L shown in FIG. 6 shows a pointing element detectable optical intensity range of the combined light formed of the first output light and the second output light.

The light outputting apparatus 2 according to the present embodiment is so set as to efficiently output light along the projection surface SC, which has a horizontally elongated shape having a 2:1 ratio between the horizontal length and the vertical length.

It is desired that the light outputted from the light outputting apparatus 2 has peak intensity at the right and left ends of the lower edge of the projection surface SC, each of which is the farthest position from the light outputting apparatus 2. To this end, the light outputting apparatus 2 according to the present embodiment is so configured that the inclination angle θa (see FIG. 3) of the first light outputting section 3 is set at 45° and the inclination angle θb (see FIG. 3) of the second light outputting section 4 is set at −45° on the assumption that an angle measured counterclockwise with respect to the imaginary central plane Pv is a positive (+) angle.

The first light outputting section 3 thus outputs light having a center axis extending in a first inclination direction inclining toward one side with respect to the imaginary central plane Pv. The second light outputting section 4 outputs light having a center axis extending in a second inclination direction inclining toward the other side with respect to the imaginary central plane Pv. The inclination angles θa and θb described above correspond to the projection surface SC having the aspect ratio described above. It is therefore desired that in a case where the target projection surface SC has a different shape (projection surface SC having aspect ratio of 16:9 or 4:3, for example), different angles are set in correspondence with the shape.

The light sources 31 and 41 each emit P-polarized light, as described above. The amount of reflection of the light incident on the optical elements 33 and 43 and reflected off the optical elements 33 and 43 is thus suppressed, whereby the light from each of the light sources 31 and 41 is effectively used.

Figure 7:
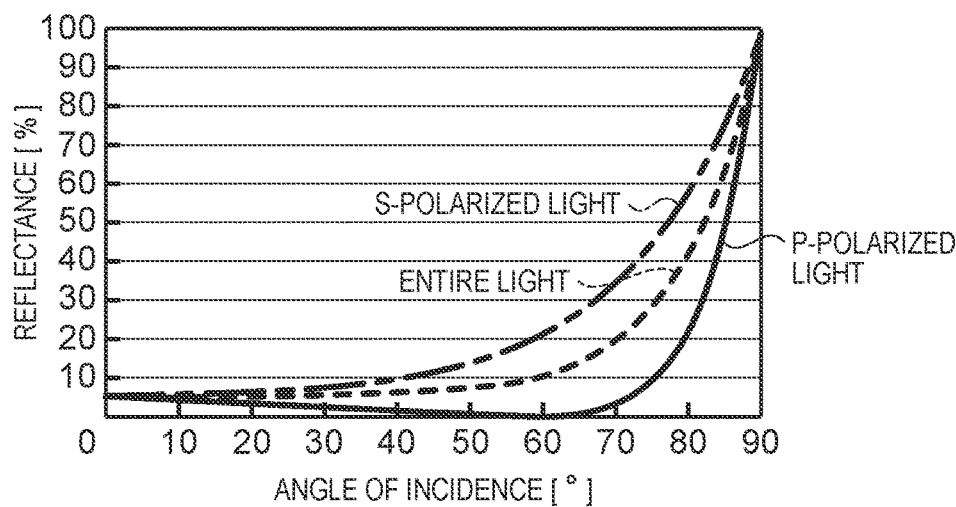
FIG. 7 shows graphs illustrating the relationship between the angle of incidence of light incident on the material of optical elements in the first embodiment and the reflectance of the light reflected off the material.

FIG. 7 shows graphs illustrating the relationship between the angle of incidence of light incident on the material of the optical elements 33 and 43 in the present embodiment and the reflectance of the light reflected off the material.

The reflectance of the light increases with the angle of incidence, as shown in FIG. 7. Comparison of the reflectance of the light between the case where the incident light is P-polarized light and the case where the incident light is S-polarized light shows that the reflectance of S-polarized light is higher than that of P-polarized light. That is, as for the transmittance of the light that passes through the material of the optical elements 33 and 43, the transmittance of P-polarized light is higher than that of S-polarized light. The reflectance of the entire light containing the P-polarized light and the S-polarized light is a value between the reflectance of S-polarized light and the reflectance of P-polarized light.

Figure 8:
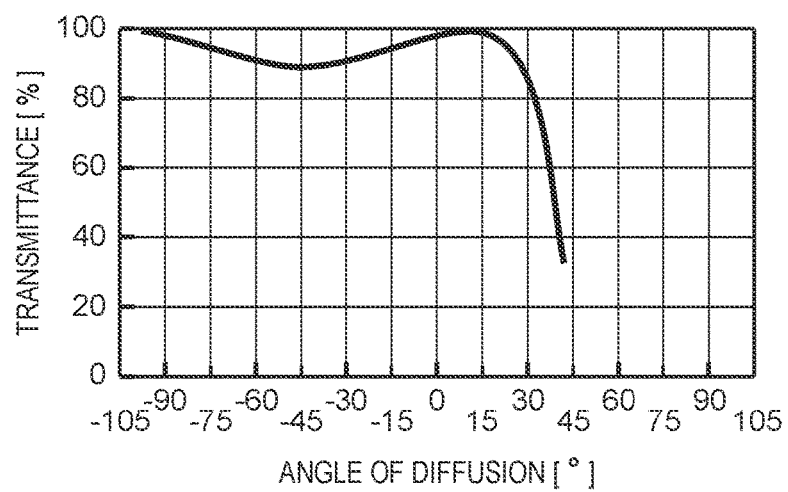
FIG. 8 is a graph showing the transmittance of the light passing through the optical element in the first embodiment and showing the result of a simulation of the relationship between the angle of diffusion and the transmittance in a case where P-polarized light is incident on the optical element.
Figure 9:
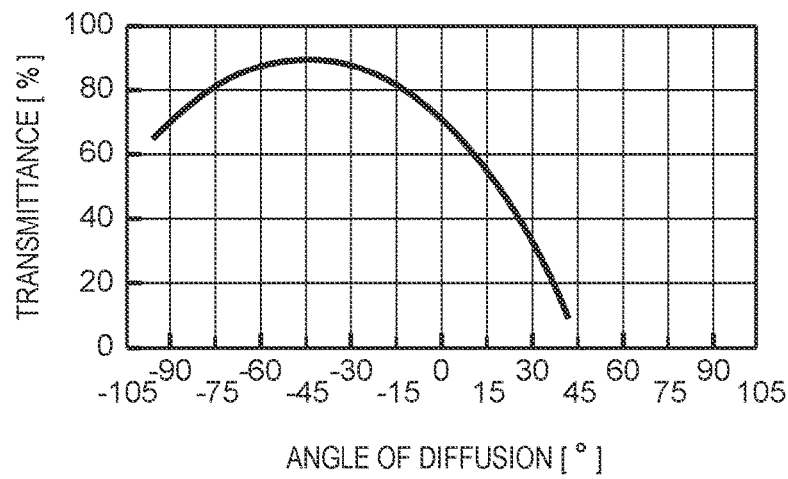
FIG. 9 is a graph for comparison with the graph in FIG. 8 and is a graph showing the result of a simulation of the relationship between the angle of diffusion and the transmittance in a case where S-polarized light is incident on the optical element unlike the situation in the present embodiment.

FIG. 8 is a graph showing the transmittance of the light passing through the optical element 43 in the light outputting apparatus 2 according to the present embodiment and showing the result of a simulation of the relationship between the angle of diffusion and the transmittance in the case where P-polarized light is incident on the optical element 43. FIG. 9 is a graph for comparison with the graph in FIG. 8 and showing the result of a simulation of the relationship between the angle of diffusion and the transmittance in the case where S-polarized light is incident on the optical element 43 unlike the situation in the present embodiment. The angle of diffusion used herein is the angle with respect to the imaginary central plane Pv (see FIG. 6).

The transmittance of S-polarized light and transmittance of P-polarized light passing through the optical element 43 is as follows: In the case of light having an angle of diffusion of −45°, that is, the light traveling in the direction along the optical axis 4A (see FIG. 3), the transmittance of P-polarized light is comparable to the transmittance of S-polarized light; and in the case of light having an angle of diffusion smaller than −45° or greater than −45°, the transmittance of P-polarized light is higher than the transmittance of S-polarized light. For example, in a case where the angle of diffusion is 0° or in a case where the angle of diffusion is −90°, the transmittance of S-polarized light is about 70%, whereas the transmittance of P-polarized light is at least 90%.

The graph showing the transmittance of light passing through the optical element 33 and the graph showing the transmittance of light passing through the optical element 43 are symmetric with respect to the imaginary central plane Pv. The transmittance of S-polarized light and transmittance of P-polarized light passing through the optical element 33 are as follows: In the case of light having an angle of diffusion of 45°, that is, the light traveling in the direction along the optical axis 3A (see FIG. 3), the transmittance of P-polarized light is comparable to the transmittance of S-polarized light; and in the case of light having an angle of diffusion greater than 45° or smaller than 45°, the transmittance of P-polarized light is higher than the transmittance of S-polarized light.

As described above, the light outputting apparatus 2 is so configured that P-polarized light is incident on the optical elements 33 and 43, whereby the light from each of the light sources 31 and 41 is effectively used.

The lenslets 331 and 431 of the optical elements 33 and 43 will now be described.

Figure 10:
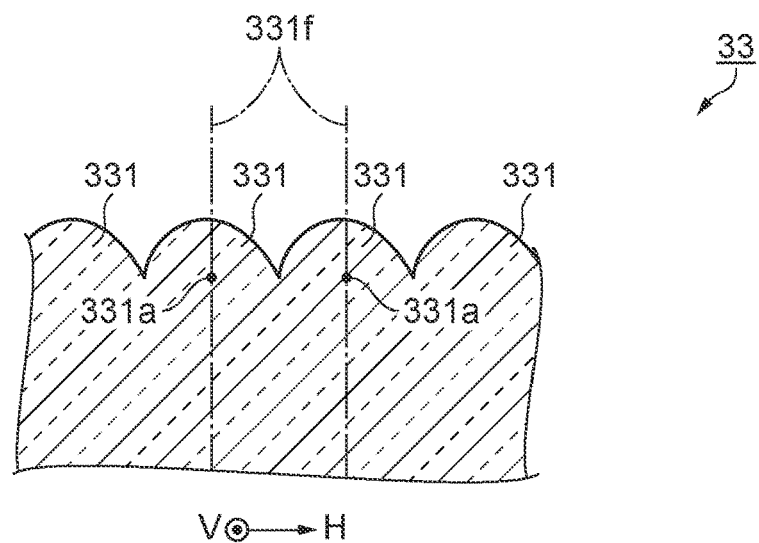
FIG. 10 is a partial plan view of the optical element in the first embodiment.

FIG. 10 is a partial plan view of the optical element 33 and describes the shape of the lenslets 331.

The plurality of lenslets 331 of the optical element 33 each have a center axis 331a, which extends in the second direction V, and are each asymmetrically formed with respect to a first lens central plane 331f, which contains the center axis 331a and extends in the first inclination direction (parallel to optical axis 3A), as shown in FIG. 10.

Although not shown, the plurality of lenslets 431 of the optical element 43 each have a center axis that extends in the second direction V and are each asymmetrically formed with respect to a second lens central plane that contains the center axis and extends in the second inclination direction (parallel to optical axis 4A).

The shape of the plurality of lenslets 331 in the optical element 33 and the shape of the plurality of lenslets 431 in the optical element 43 are symmetric with respect to the imaginary central plane Pv. The asymmetric shape of each of the lenslets 331 and 431 allows the optical intensity distributions of the light outputted from the first light outputting section 3 and the light outputted from the second light outputting section 4 in the area along the projection surface SC (intensity distributions 3L and 4L) to be asymmetric with respect to the optical axes 3A and 4A, whereby the combined light is allowed to have appropriate optical intensity, which will be described later. The efficiency of use of the light emitted from each of the light sources 31 and 41 is therefore improved, whereby the light outputting apparatus 2 can be used with a wider screen.

The intensity distribution of the light outputted from the light outputting apparatus 2 in the area along the projection surface SC will now be described with reference to FIGS. 6 and 11.

Figure 11:
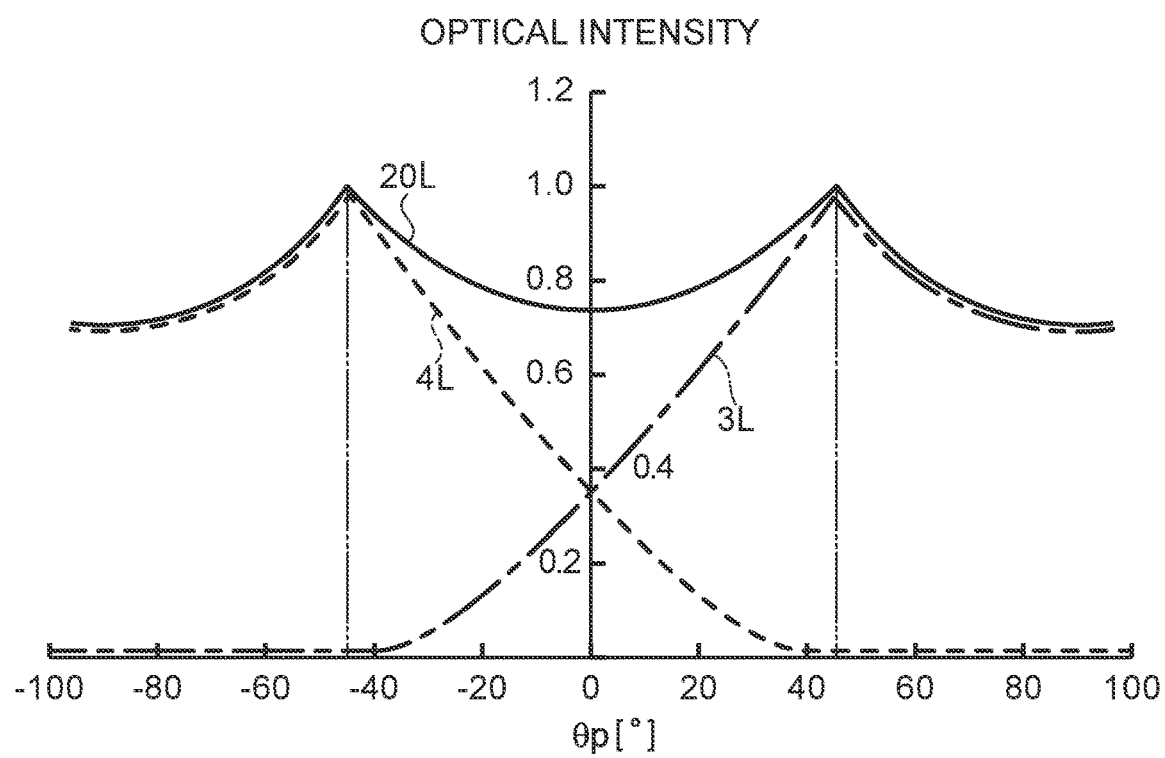
FIG. 11 shows the intensity distribution of the light outputted from the light outputting apparatus in the first embodiment.

FIG. 11 shows the intensity distribution of the light outputted from the light outputting apparatus 2 and further shows the relationship between an angle θp with respect to the imaginary central plane Pv (see FIG. 6) and the optical intensity. Specifically, FIG. 11 shows the intensity distribution 3L of the first output light, the intensity distribution 4L of the second output light, and the intensity distribution 20L of the combined light that is the combination of the first output light and the second output light.

The optical intensity of the first output light peaks at an angle θp of 45°, that is, in the direction of the center axis of the light outputted by the first light outputting section 3 (first inclination direction), as indicated by the intensity distribution 3L in FIG. 11. The light having the peak optical intensity is outputted toward the right (+X-side) end of the lower edge of the projection surface SC, that is, the position farthest from the first light outputting section 3 in the area that is part of the projection surface SC and irradiated with the light from the first light outputting section 3 as indicated by the intensity distribution 3L in FIG. 6.

Since the lenslets 331 are each asymmetrically shaped, as described above, the optical intensity of the first output light in the area where the angle θp is smaller than 45° is lower than the optical intensity of the first output light in the area where the angle θp is greater than 45°, as shown in FIG. 11.

Specifically, the intensity of the first output light decreases as the angle θp increases beyond 45°, that is, as the point of interest changes from the right end of the lower edge of the projection surface SC toward the right end of the upper edge of the projection surface SC in accordance with the distance from the light outputting apparatus 2 to the right edge of the projection surface SC, as indicated by the intensity distribution 3L in FIGS. 6 and 11. The first output light has pointing element detectable optical intensity in the area where the angle θp is greater than 45°, as indicated by the intensity distribution 3L in FIG. 6.

Further, the intensity of the first output light decreases as the angle θp decreases beyond 45°, that is, the point of interest changes from the right end of the lower edge of the projection surface SC toward the imaginary central plane Pv. The degree of the decrease is greater than the degree of the decrease in the area where the angle θp is greater than 45°. The first output light is outputted also to the left (−X-side) of the imaginary central plane Pv in the area along the projection surface SC, and the intensity of the light outputted leftward (toward −X side) is particularly low.

On the other hand, the intensity distribution 4L of the second output light is so configured that the intensity distribution 3L of the first output light and the intensity distribution 4L of the second output light are symmetric with respect to the angle θp of 0°, and part of the second output light overlaps with part of the first output light on both sides of the imaginary central plane Pv, as shown in FIGS. 6 and 11.

As described above, the first light outputting section 3 outputs the highest intensity light in the first inclination direction and further outputs light to the other area in such a way that the intensity of the light traveling in the direction inclining toward the imaginary central plane Pv with respect to the first inclination direction is lower than the intensity of the light traveling in the direction inclining toward the side opposite the imaginary central plane Pv with respect to the first inclination direction. The second light outputting section 4 outputs the highest intensity light in the second inclination direction and further outputs light to the other area in such a way that the intensity of the light traveling in the direction inclining toward the imaginary central plane Pv with respect to the second inclination direction is lower than the intensity of the light traveling in the direction inclining toward the side opposite the imaginary central plane Pv with respect to the second inclination direction.

The first output light and the second output light overlap with each other in the area where the angle θp ranges from about 40° to about −40°, as shown in FIG. 11, where the overlapping light has pointing element detectable optical intensity. The intensity of the light outputted from the light outputting apparatus 2 (combined light formed of first output light and second output light) is maximized at the angles θp of 45° and −45° and smoothly decreases in the area where the angle θp has the other values, as indicated by the intensity distribution 20L in FIG. 11. That is, the light outputted from the light outputting apparatus 2 travels along the entire projection surface SC in such a way that the light has the intensity corresponding to the distance from the light outputting apparatus 2 to each edge of the projection surface SC, that is, the pointing element detectable optical intensity, as indicated by the intensity distribution 20L in FIG. 6.

As described above, the light outputted from the light outputting apparatus 2 is optimized in terms of the optical intensity across the entire area along the projection surface SC. The projector 1 can therefore detect the position of the pointing element on the projection surface SC with accuracy.

Further, the first light outputting section 3 and the second light outputting section 4, in which the optical elements 33 and 43 include the plurality of lenslets 331 and 431, respectively, and the lenslets 331 and 431 widen the incident light in the first direction H and therefore allow relaxation of the precision in the alignment between the light source 31 and the optical element 33 and the precision in the alignment between the light source 41 and the optical element 43.

The effect of allowing the precision of the alignment between the light sources 31, 41 and the optical elements 33, 43 will be described in comparison with a light outputting section 130 including a lens 131 different from the optical elements 33 and 43 in the present embodiment.

Figure 12:
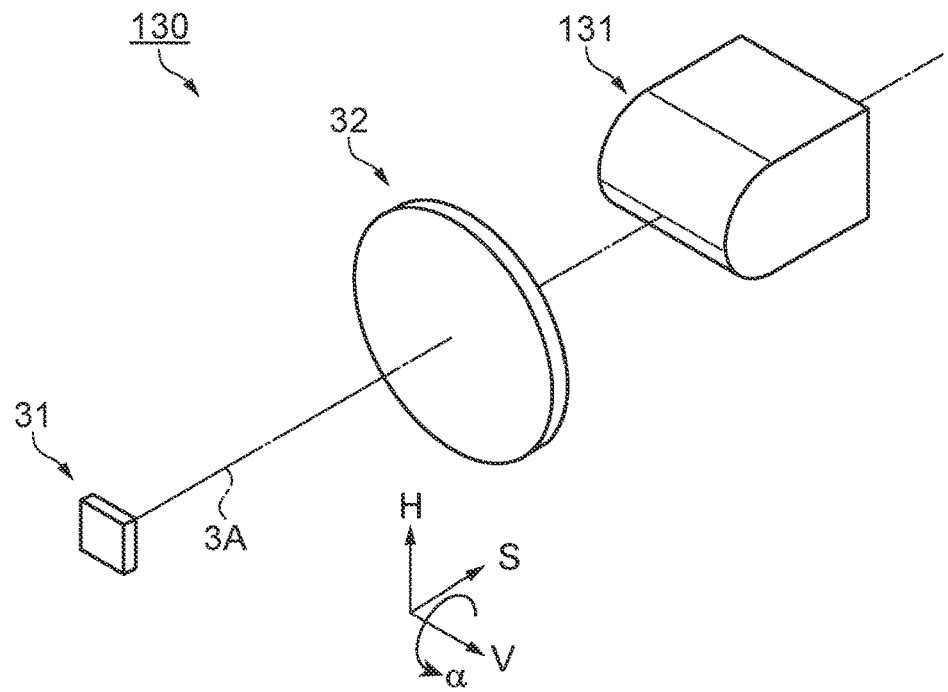
FIG. 12 is a diagram for comparison with the diagram of FIG. 4.

FIG. 12 is a diagram for comparison with the diagram of FIG. 4 and is a perspective view diagrammatically showing the light outputting section 130.

The lens 131 provided in the light outputting section 130 has an entirely convex surface on the light incident side and a flat surface on the light exiting side, as shown in FIG. 12. The lens 131 widens in the first direction H the light parallelized by the collimator lens 32 and maintains in the second direction V the direction of the light parallelized by the collimator lens 32.

In the light outputting section 130, however, if the positional relationship between the light source 31 and the lens 131 deteriorates in the first direction H or in the direction of rotation around a reference axis extending in the second direction V (direction a in FIG. 12), the intensity distribution of the outputted light is offset in accordance with the amount of deterioration. That is, the optical intensity distribution in the area along the projection surface SC varies, and it is therefore difficult for the projector 1 to detect the position of the pointing element on the projection surface SC with accuracy.

On the other hand, in the first light outputting section 3 and the second light outputting section 4 in the present embodiment, since the plurality of lenslets 331 and 431 in the optical elements 33 and 43 widen the light incident thereon, the amount of offset of the intensity distribution of the outputted light is reduced even if the deterioration in the same direction described above occurs (first direction H and direction a in FIG. 4). That is, since the light having exited out of the optical elements 33 and 43 is formed of the light fluxes widened by the plurality of lenslets 331 and 431 and superimposed on one another, the variation in the optical intensity distribution is suppressed even if the deterioration in the direction described above occurs.

The first light outputting section 3 and the second light outputting section 4, in which the optical elements 33 and 43 include the plurality of lenslets 331 and 431, therefore allow relaxation of the precision in the alignment between the light sources 31, 41 and the optical elements 33, 43, unlike the configuration in which the widening member is formed of the lens 131.

As described above, the light outputting apparatus 2 and the image display system 100 according to the present embodiment can provide the following advantageous effects.

(1) The light outputting apparatus 2, which includes the optical elements 33 and 43, which widen the light in the first direction H, can output light over the area along the projection surface SC.

Further, the light outputting apparatus 2, in which the optical elements 33 and 43 include the plurality of lenslets 331 and 431, allows relaxation of the precision in the alignment between the light sources 31, 41 and the optical elements 33, 43, unlike the configuration in which the widening member is formed of the lens 131. The light outputting apparatus 2 provided by the present embodiment therefore allows the assembly man-hour to be reduced and light having suppressed variation in the optical intensity distribution to be outputted over the area along the projection surface SC.

Moreover, since the light fluxes having exited out of the optical elements 33 and 43 are formed of the light fluxes widened by the plurality of lenslets 331 and 431 and superimposed on one another, the degree of dependence on the intensity distribution of the light emitted from each of the light sources 31 and 41 can be reduced, whereby the light sources 31 and 41 can be selected with increased flexibility.

(2) Since the light from the light emitting portion smaller in the second direction V than in the first direction H is incident on each of the collimator lenses 32 and 42, the light having exited out of each of the collimator lenses 32 and 42 is light more parallelized in the second direction V than in the first direction H. The optical elements then each widen the light incident thereon only in the direction corresponding to the first direction. The light outputting apparatus 2 can therefore suppress diffraction and output light along a wider projection surface SC.

(3) The light outputting apparatus 2 includes the first light outputting section 3, which outputs light having a center axis extending in the first inclination direction, which inclines toward one side with respect to the imaginary central plane Pv, and the second light outputting section 4, which outputs light having a center axis extending in the second inclination direction, which inclines toward the other side with respect to the imaginary central plane Pv. The light outputting apparatus 2 can therefore efficiently output light along the wide projection surface SC with the light toward the vicinities of the farthest corners of the rectangular projection surface SC having increased intensity.

(4) The light outputting apparatus 2 includes the first light outputting section 3 and the second light outputting section 4 disposed as described above, and the plurality of lenslets 331 and 431 are each asymmetrically formed as described above. The light outputting apparatus 2 can therefore output light having a sufficient optical intensity distribution that allows stable detection of the pointing element across the entire area along the rectangular projection surface SC with no increase in the intensity of the light from the light sources 31 and 41. The light outputting apparatus 2 provided by the present embodiment can therefore efficiently output light having an appropriate optical intensity distribution over the areas along the projection surface SC that are separate from the light outputting apparatus 2 by different distances.

(5) Since the light outputting apparatus 2 is so configured that P-polarized light is incident on the optical elements 33 and 43, reflection at the optical elements 33 and 43 can be suppressed, whereby the light emitted from each of the light sources 31 and 41 can be effectively used.

(6) The image display system 100, which includes the light outputting apparatus 2, can detect the position of the pointing element on the projection surface SC with accuracy and can reliably project an image according to the result of the detection, change the image, and other types of operation.

(7) Since the light outputting apparatus 2 outputs light that belongs to a band of wavelengths (about 940 nm) longer than the wavelength of light used by a remote control or any other device or the wavelength of light primarily emitted from a fluorescent lamp, malfunction of the projector 1 due to the light emitted from a remote control or a fluorescent lamp is avoided, and the projector 1 can therefore stably detect the position of a pointing element on the projection surface SC and project an image according to the result of the detection.

Second Embodiment

A light outputting apparatus according to a second embodiment will be described below with reference to the drawings. In the following description, the same components as those in the first embodiment have the same reference characters, and detailed descriptions of the same components will be omitted or simplified.

The light outputting apparatus according to the present embodiment includes optical elements 33A and 43A (optical element 43A is omitted in the drawings), which differ from the optical elements 33 and 43 provided in the light outputting apparatus 2 according to the first embodiment in terms of light-incident-side shape.

Figure 13:
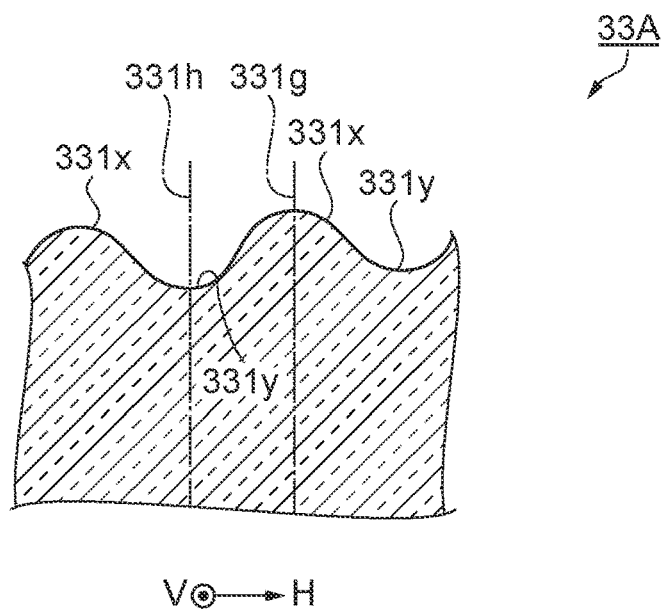
FIG. 13 is a plan view showing part of the light incident side of an optical element in a second embodiment.

FIG. 13 is a plan view showing part of the light incident side of the optical element 33A.

The optical element 33A includes a plurality of lenslets 331x arranged along the first direction H and each extending in the second direction V. The optical element 33A has recesses 331y located between adjacent lenslets 331x and each having a curved surface smoothly connected to the curved surfaces of the adjacent lenslets 331x.

The lenslets 331x are each asymmetrically formed with respect to a first lens central plane 331g containing the center axis of the lenslet 331x, as the lenslets 331 in the first embodiment are.

The recesses 331y are each asymmetrically formed with respect to a recess central plane 331h containing the center axis of the recess 331y and parallel to the first lens central plane 331g. The recesses 331y are also so shaped as to contribute to the widening of the incident light.

The optical element 43A, which is not shown, is so formed that optical elements 33A and 43A are symmetric with respect to the imaginary central plane Pv and includes lenslets 431x and recesses 431y.

The light outputting apparatus according to the present embodiment outputs light having suppressed variation in the optical intensity over the entire area along the projection surface SC, as the light outputting apparatus 2 according to the first embodiment does.

As described above, the light outputting apparatus according to the present embodiment can provide the following advantageous effects.

(1) Since the optical elements 33A and 43A are provided with the recesses 331y and 431y, which contribute to the widening of the light incident on the portions between adjacent lenslets 331x and between adjacent lenslets 431x, the light emitted from each of the light sources 31 and 41 can be more efficiently used.

(2) Since the optical elements 33A and 43A are so formed that the lenslets 331x and 431x are smoothly connected to the recesses 331y and 431y, respectively, a die for molding the optical elements 33A and 43A can be readily manufactured, and the optical elements 33A and 43A can be readily molded.

Third Embodiment

A light outputting apparatus 500 according to a third embodiment will be described below with reference to the drawings. In the following description, the same components as those in the first embodiment have the same reference characters, and detailed descriptions of the same components will be omitted or simplified.

Figure 14:
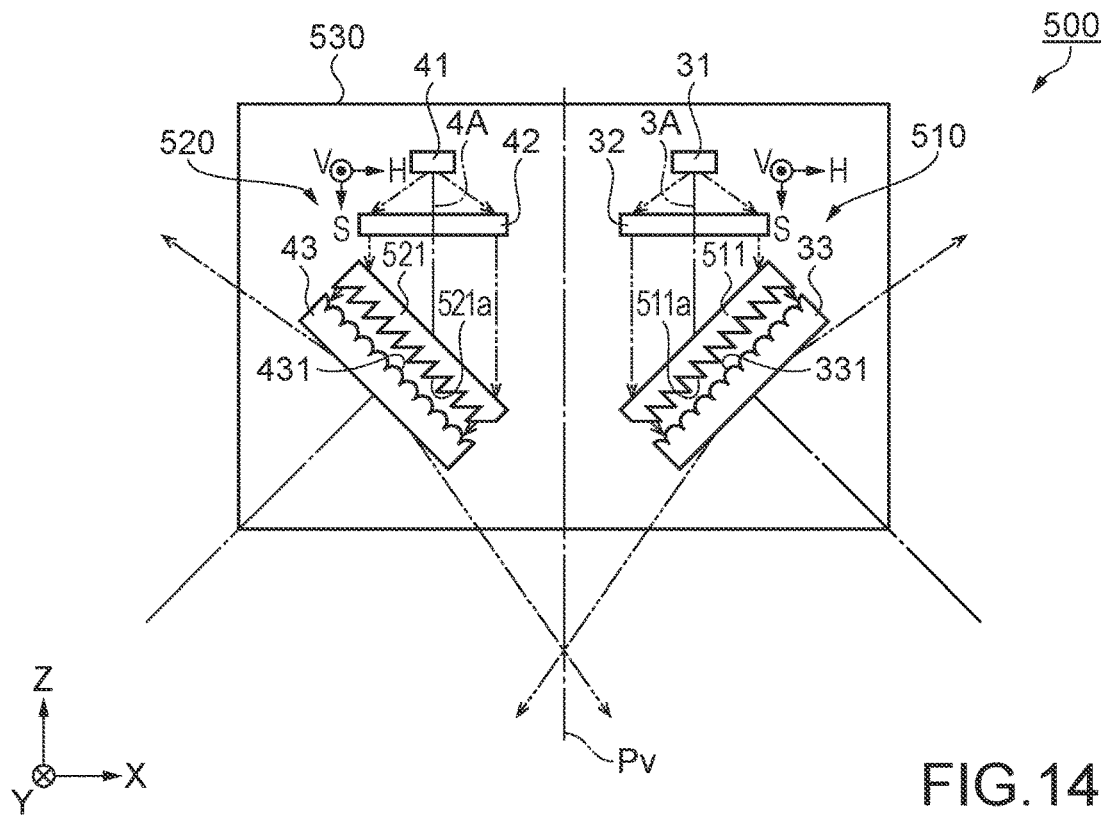
FIG. 14 is a diagrammatic view showing a schematic configuration of a light outputting apparatus in a third embodiment.

FIG. 14 is a diagrammatic view showing a schematic configuration of the light outputting apparatus 500 according to the present embodiment.

The light outputting apparatus 500 includes a first light outputting section 510, a second light outputting section 520, and an enclosure 530, as shown in FIG. 14.

The first light outputting section 510 includes a prism array 511 in addition to the light source 31, the collimator lens 32, and the optical element 33. The second light outputting section 520 includes a prism array 521 in addition to the light source 41, the collimator lens 42, and the optical element 43, as the first light outputting section 510 does.

The light sources 31 and 41 are so disposed that the optical axes 3A and 4A are roughly parallel to the imaginary central plane Pv, and the light sources 31 and 41 emit light downward.

The collimator lens 32 is disposed below the light source 31 and parallelizes the light emitted from the light source 31.

The prism array 511 is disposed between the collimator lens 32 and the optical element 33 in the optical path, has a flat surface on the light incident side (side facing collimator lens 32), and is provided with a plurality of prisms 511a on the light exiting side (side facing optical element 33). The prism array 511 is so disposed that the plurality of prisms 511a incline with respect to the optical axis 3A of the light source 31 and face obliquely rightward and downward. The plurality of prisms 511a are each formed in a triangular prismatic shape extending in the second direction V and are formed in correspondence with the lenslets 331 of the optical element 33.

The light having exited out of the collimator lens 32 is deflected by the prism array 511 in an obliquely rightward and downward direction.

The optical element 33 is so disposed that the lenslets 331 face the prisms 511a of the prism array 511, widens the light in the first direction H having exited out of the prism array 511, and outputs the resultant light having a center axis extending obliquely rightward and downward. That is, the optical element 33 widens the light incident thereon in the direction corresponding to the first direction H, which is perpendicular to the optical axis 3A. Further, the optical element 33 widens the light incident thereon only in the direction corresponding to the first direction H, which is perpendicular to the optical axis 3A.

The second light outputting section 520 is so configured that each component of the first light outputting section 510 and the corresponding component of the second light outputting section 520 are symmetric with respect to the imaginary central plane Pv, widens the light in the first direction H emitted from the light source 41, and outputs the resultant light having a center axis extending obliquely leftward and downward. That is, the optical element 43 widens the light having exited out of the prism array 521 in the direction corresponding to the first direction H, which is perpendicular to the optical axis 4A. Further, the optical element 43 widens the light incident thereon only in the direction corresponding to the first direction H, which is perpendicular to the optical axis 4A.

As described above, the light outputting apparatus 500 includes the prism arrays 511 and 521 and is so configured that the directions of the light fluxes emitted from the light sources 31 and 41 differ from the directions of the light fluxes outputted from the first light outputting section 510 and the second light outputting section 520. The light outputting apparatus 500 outputs light over the area along the projection surface SC in such a way that the first light outputting section 510 outputs light having a center axis extending in the first inclination direction inclining toward one side with respect to the imaginary central plane Pv and the second light outputting section 520 outputs light having a center axis extending in the second inclination direction inclining toward the other side with respect to the imaginary central plane Pv.

The present embodiment has been described with reference to the case where the light sources 31 and 41 are so disposed that the optical axes 3A and 4A are roughly parallel to the imaginary central plane Pv, but not necessarily. It is also conceivable to employ a configuration in which the shapes of the prism arrays 511 and 521 are so changed that the optical axes 3A and 4A incline with respect to the imaginary central plane Pv. It is also conceivable to employ a configuration in which the angle with respect to the imaginary central plane Pv differs between the optical axis 3A and the optical axis 4A.

As described above, the light outputting apparatus 500 according to the present embodiment can provide the following advantageous effects.

(1) Since the directions of the light fluxes emitted from the light sources 31 and 41 are allowed to differ from the light fluxes outputted from the first light outputting section 510 and the second light outputting section 520, the light sources 31 and 41 are disposed in the light outputting apparatus 500 with increased flexibility.

(2) Since the distance between the optical element 33 and the optical element 43 can be reduced, the size of the light outputting apparatus 500 in the rightward/leftward direction can be reduced. Further, since the reduction in the distance between the optical element 33 and the optical element 43 allows the area where the light outputted from the first light outputting section 510 and the light outputted from the second light outputting section 520 overlap with each other to be closer to the light outputting apparatus 500, the light outputting apparatus 500 provided by the present embodiment can be disposed in a position closer to the projection surface SC.

Fourth Embodiment

A light outputting apparatus 600 according to a fourth embodiment will be described below with reference to the drawings. In the following description, the same components as those in the first embodiment have the same reference characters, and detailed descriptions of the same components will be omitted or simplified.

Figure 15:
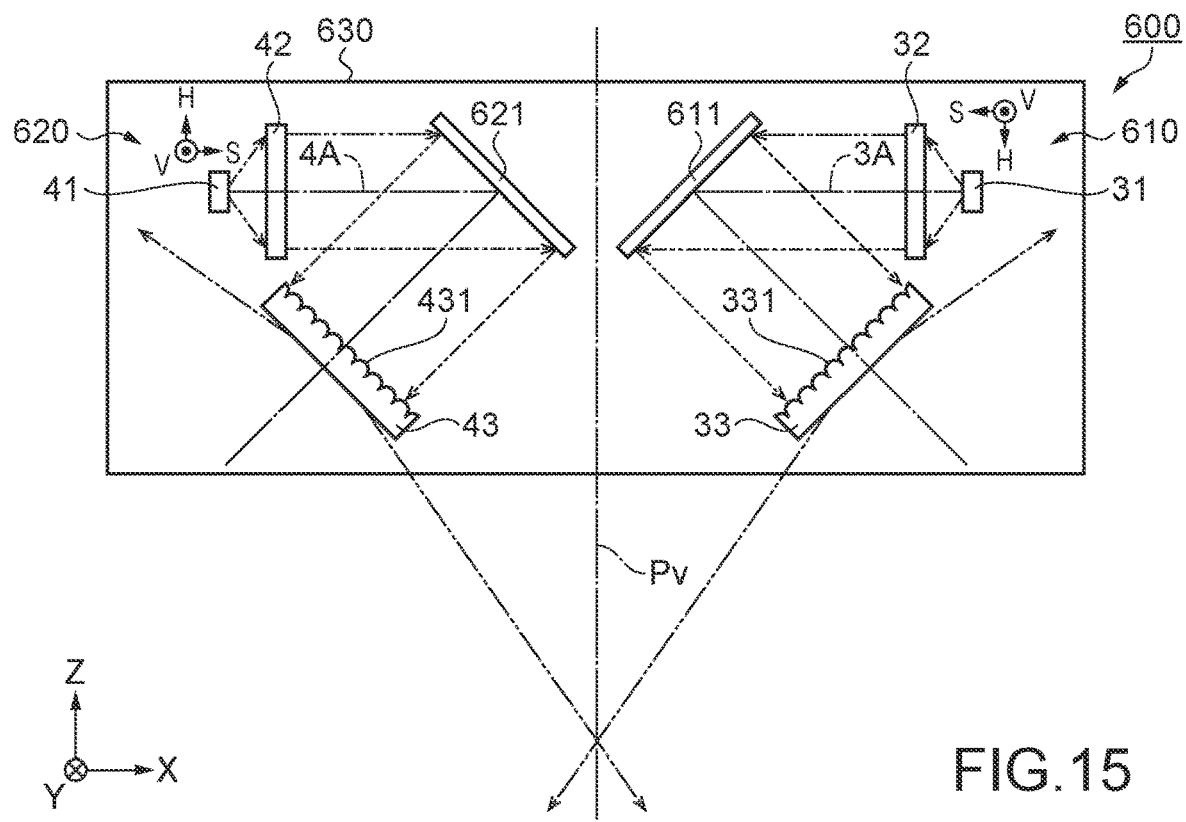
FIG. 15 is a diagrammatic view showing a schematic configuration of a light outputting apparatus in a fourth embodiment.

FIG. 15 is a diagrammatic view showing a schematic configuration of the light outputting apparatus 600 according to the present embodiment.

The light outputting apparatus 600 includes a first light outputting section 610, a second light outputting section 620, and an enclosure 630, as shown in FIG. 15.

The first light outputting section 610 includes a mirror 611 in addition to the light source 31, the collimator lens 32, and the optical element 33. The second light outputting section 620 includes a mirror 621 in addition to the light source 41, the collimator lens 42, and the optical element 43.

The light sources 31 and 41 are so disposed as to each emit light toward the other with the imaginary central plane Pv sandwiched therebetween.

The collimator lens 32 is disposed on the left of the light source 31 and parallelizes the light emitted from the light source 31.

The mirror 611 is disposed between the collimator lens 32 and the imaginary central plane Pv and reflects the light having exited out of the collimator lens 32 obliquely rightward and downward. The optical element 33 is so disposed in the vicinity of the collimator lens 32 that the lenslets 331 face the mirror 611. The optical element 33 widens the light in the first direction H reflected off the mirror 611 and outputs the resultant light having a center axis extending obliquely rightward and downward. That is, the optical element 33 widens the light reflected off the mirror 611 in the direction corresponding to the first direction H, which is perpendicular to the optical axis 3A. Further, the optical element 33 widens the light incident thereon only in the direction corresponding to the first direction H, which is perpendicular to the optical axis 3A.

The second light outputting section 620 is so configured that each component of the first light outputting section 610 and the corresponding component of the second light outputting section 620 are symmetric with respect to the imaginary central plane Pv, widens the light in the first direction H emitted from the light source 41 and reflected off the mirror 621, and outputs the resultant light having a center axis extending the obliquely leftward and downward. That is, the optical element 43 widens the light reflected off the mirror 621 in the direction corresponding to the first direction H, which is perpendicular to the optical axis 4A. Further, the optical element 43 widens the light incident thereon only in the direction corresponding to the first direction H, which is perpendicular to the optical axis 4A.

As described above, the light outputting apparatus 600 is so configured that the first light outputting section 610 and the second light outputting section 620 are disposed in a small area in the upward/downward direction. The light outputting apparatus 600 outputs light over the area along the projection surface SC in such a way that the first light outputting section 610 outputs light having a center axis extending in the first inclination direction inclining toward one side with respect to the imaginary central plane Pv and the second light outputting section 620 outputs light having a center axis extending in the second inclination direction inclining toward other side with respect to the imaginary central plane Pv.

As described above, the light outputting apparatus 600 according to the present embodiment can provide the following advantageous effects.

Since the light outputting apparatus 600 is so configured that the first light outputting section 610 and the second light outputting section 620 are disposed in a small area in the upward/downward direction, the size of the light outputting apparatus 600 can be reduced in the upward/downward direction. Further, in a case where terminals (not shown) via which electric power is supplied to the light sources 31 and 41 are provided on the side opposite the light exiting side, the size reduction effect is remarkably advantageous.

Variations

The embodiments described above may be changed as follows.

The optical element 33 in the first light outputting section 3 and the optical element 43 in the second light outputting section 4 of the light outputting apparatus 2 in the first embodiment may be integrated with each other to form another light outputting apparatus.

According to the configuration described above, the relative positional precision between the optical element 33 and the optical element 43 can be increased, whereby discrepancy between the intensity distribution of the first output light and the intensity distribution of the second output light can be suppressed. A light outputting apparatus that outputs light having further suppressed variation in the optical intensity in the area along the projection surface SC can therefore be provided.

Further, according to the configuration described above, a light outputting apparatus smaller than the light outputting apparatus 2 can be provided.

The light outputting apparatus 2, 500, and 600 according to the embodiments described above each use the light sources 31 and 41 that each emit P-polarized light and may instead use light sources that each emit S-polarized light. In this configuration, it is desirable that λ/2 plates are disposed between the collimator lenses 32, 42 and the optical elements 33, 43 so that P-polarized light is incident on the optical elements 33 and 43.

The collimator lenses 32 and 42 may instead be each so configured that the curvature of the lens surface in the first direction H differs from the curvature of the lens surface in the second direction V. For example, collimator lenses 32 and 42 having curvature that allows the incident light in the second direction V to be parallelized and causes the incident light in the first direction H to travel as slightly non-parallelized light allow suppression of diffraction at the optical elements 33 and 43.

The lenslets 331 and 431 in the optical elements 33 and 43 in the embodiments described above are each asymmetrically formed. Instead, in a light outputting apparatus used in a system that permits variation in the optical intensity, optical elements each including symmetrically formed lenslets may be used.

In the optical elements 33 and 43 in the embodiments described above, the plurality of lenslets 331 and 431 are regularly formed, but not necessarily.

Figure 16:
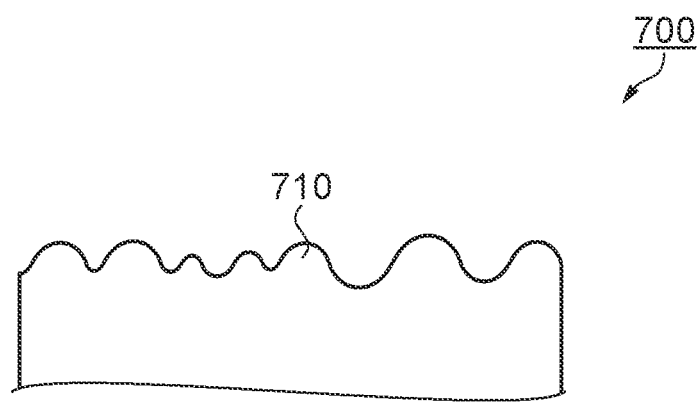
FIG. 16 is a plan view showing part of an optical element according to a variation.

FIG. 16 is a plan view showing part of an optical element 700, which is one variation.

A light outputting apparatus using the optical element 700 including a plurality of lenslets 710 having different sizes and arranged at different intervals may be configured, as shown in FIG. 16. The optical element 700 shown in FIG. 16 includes a plurality of lenslets 710 having different sizes and formed in similar shapes. According to the configuration described above, diffraction of the light outputted from the light outputting apparatus can be suppressed.

The light outputting apparatus 2, 500, and 600 according to the embodiments described above each include two light outputting sections but not necessarily and may instead each include one light outputting section or three or more light outputting sections.

The image display system 100 according to the embodiments described above is so configured that the light outputting apparatus 2, 500, and 600 are installed above the projection surface SC and may instead be so configured that the light outputting apparatus is disposed sideways with respect to the projection surface SC or below the projection surface SC.

The light sources 31 and 41 in the embodiments described above are each formed of a laser light source but not necessarily and may instead be each formed, for example, of a plurality of highly directional LEDs so arranged along one row that the arrangement direction coincides with the first direction H.

The above embodiments have been described with reference to the configuration in which the image display system 100 uses the front-projection-type projector 1, in which an image is projected from side facing the front side of the projection surface, but not necessarily, and any apparatus that displays an image may be employed. For example, a rear-projection-type projector, which projects an image from side facing the rear side of the screen may be employed, or the screen on which an image is projected may be replaced, for example, with a liquid crystal display, a CRT (cathode ray tube), a plasma display, or an organic EL display.

The entire disclosure of Japanese Patent Application No. 2017-62391, filed on Mar. 28, 2017 is expressly incorporated by reference herein.

What is claimed is:

1. A light outputting apparatus comprising a light outputting section that outputs light,
  wherein the light outputting section includes
  a light source that emits light,
  a collimator lens for parallelizing the light emitted from the light source, and
  an optical element including a plurality of lenslets that widen the light having passed through the collimator lens in a direction perpendicular to an optical axis of the light source and corresponding to a first direction that is one of first and second directions perpendicular to each other.

2. The light outputting apparatus according to claim 1,
  wherein the light source has a light emitting portion larger in the first direction than in the second direction, and
  the optical element widens the light incident thereon only in the direction corresponding to the first direction.

3. The light outputting apparatus according to claim 1,
  wherein the light outputting section is formed of a first light outputting section and a second light outputting section that are so disposed with respect to an imaginary central plane along the second direction that light outputted from each of the light outputting sections travels gradually away from the imaginary central plane,
  the first light outputting section outputs light having a center axis extending in a first inclination direction inclining toward one side with respect to the imaginary central plane,
  the second light outputting section outputs light having a center axis extending in a second inclination direction inclining toward another side with respect to the imaginary central plane, and
  the first light outputting section and the second light outputting section are so disposed that part of the light outputted by the first light outputting section and part of the light outputted by the second light outputting section overlap with each other on both sides of the imaginary central plane.

4. The light outputting apparatus according to claim 3, wherein the plurality of lenslets each have a center axis extending along the second direction, the plurality of lenslets in the first light outputting section are each formed asymmetrically with respect to a first lens central plane that contains the center axis and extends along the first inclination direction, the plurality of lenslets in the second light outputting section are each formed asymmetrically with respect to a second lens central plane that contains the center axis and extends along the second inclination direction, the first light outputting section outputs light in such a way that intensity of light traveling in a direction inclining toward the imaginary central plane with respect to the first inclination direction is lower than intensity of light traveling in a direction inclining toward a side opposite the imaginary central plane with respect to the first inclination direction, and the second light outputting section outputs light in such a way that intensity of light traveling in a direction inclining toward the imaginary central plane with respect to the second inclination direction is lower than intensity of light traveling in a direction inclining toward a side opposite the imaginary central plane with respect to the second inclination direction.

5. The light outputting apparatus according to claim 3, wherein the optical element in the first light outputting section and the optical element in the second light outputting section are integrated with each other.

6. The light outputting apparatus according to claim 1, wherein the light incident on the optical element is P-polarized light.

7. The light outputting apparatus according to claim 1, wherein the collimator lens is so configured that curvature of a lens surface in the first direction differs from curvature of a lens surface in the second direction.

8. An image display system comprising:
the light outputting apparatus according to claim 1;
a detection apparatus that detects a position where light outputted from the light outputting apparatus is reflected; and
a projection apparatus that projects an image according to a result of the detection performed by the detection apparatus.

9. An image display system comprising:
the light outputting apparatus according to claim 2;
a detection apparatus that detects a position where light outputted from the light outputting apparatus is reflected; and
a projection apparatus that projects an image according to a result of the detection performed by the detection apparatus.

10. An image display system comprising:
the light outputting apparatus according to claim 3;
a detection apparatus that detects a position where light outputted from the light outputting apparatus is reflected; and
a projection apparatus that projects an image according to a result of the detection performed by the detection apparatus.

11. An image display system comprising:
the light outputting apparatus according to claim 4;
a detection apparatus that detects a position where light outputted from the light outputting apparatus is reflected; and
a projection apparatus that projects an image according to a result of the detection performed by the detection apparatus.

12. An image display system comprising:
the light outputting apparatus according to claim 5;
a detection apparatus that detects a position where light outputted from the light outputting apparatus is reflected; and
a projection apparatus that projects an image according to a result of the detection performed by the detection apparatus.

13. An image display system comprising:
the light outputting apparatus according to claim 6;
a detection apparatus that detects a position where light outputted from the light outputting apparatus is reflected; and
a projection apparatus that projects an image according to a result of the detection performed by the detection apparatus.

14. An image display system comprising:
the light outputting apparatus according to claim 7;
a detection apparatus that detects a position where light outputted from the light outputting apparatus is reflected; and
a projection apparatus that projects an image according to a result of the detection performed by the detection apparatus.

* * * * *